(12) United States Patent
Malek et al.

(10) Patent No.: US 8,346,869 B2
(45) Date of Patent: Jan. 1, 2013

(54) GRANULAR DATA SYNCHRONIZATION FOR EDITING MULTIPLE DATA OBJECTS

(75) Inventors: Alexander Malek, Seattle, WA (US); Alexander D. Tudor, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 12/422,462

(22) Filed: Apr. 13, 2009

(65) Prior Publication Data
US 2010/0262647 A1 Oct. 14, 2010

(51) Int. Cl.
  G06F 15/16 (2006.01)
  G06F 15/167 (2006.01)
  G06F 7/00 (2006.01)
(52) U.S. Cl. .......... 709/205; 709/213; 707/610
(58) Field of Classification Search .......... 709/208–211, 709/217–219, 223–226; 707/999.2, 999.201–999.206, 610, 608
See application file for complete search history.

(56) References Cited

U.S. PATENT DOCUMENTS

| | | | |
|---|---|---|---|
| 5,826,252 A * | 10/1998 | Wolters et al. | 717/101 |
| 6,253,282 B1 | 6/2001 | Gish et al. | |
| 6,564,246 B1 | 5/2003 | Varma et al. | |
| 7,127,501 B1 * | 10/2006 | Beir et al. | 709/219 |
| 7,130,872 B2 * | 10/2006 | de Bonet | 1/1 |
| 7,203,948 B2 | 4/2007 | Mukundan et al. | |
| 7,249,314 B2 * | 7/2007 | Walker et al. | 715/205 |
| 7,287,256 B1 * | 10/2007 | Lozben et al. | 719/316 |
| 7,783,665 B1 * | 8/2010 | Tormasov et al. | 707/783 |
| 2004/0068516 A1 * | 4/2004 | Lee et al. | 707/103 Y |
| 2005/0102370 A1 * | 5/2005 | Lin et al. | 709/217 |
| 2005/0273759 A1 | 12/2005 | Lucassen | |
| 2008/0140732 A1 * | 6/2008 | Wilson et al. | 707/201 |
| 2009/0006529 A1 | 1/2009 | Singh et al. | |
| 2009/0125518 A1 * | 5/2009 | Bailor et al. | 707/8 |

OTHER PUBLICATIONS

Daniel R.: "Model Driven Development Using Flex Builder and LCDS "Next" (Flex Camp Boston 2008)", Dec. 2008, pp. 1-3. http://life.neophi.com/danielr/2008/12/model_driven_development_using.html.
Horáh et al, DEBVisDic—First Version of New Client-Server Wordnet Browsing and Editing Tool. GWC 2006, Proceedings, pp. 325-328. http://nlpweb.kaist.ac.kr/gwc/pdf2006/70.pdf.
Oracle Business Components for Java. An Oracle Technical White Paper. Jan. 29, 2009, pp. 1-25 http://www.oracle.com/technology/products/jdev/info/techwp20/wp.html#multiple-views.
Jonathan P. Munson et al. : "Sync: A System for Mobile Collaborative Applications", Depart of Computer Science, University of NC. Mar. 14, 1997, pp. 1-13. ftp://ftp.cs.unc.edu/pub/users/dewan/papers/sync.pdf.
Dr. Jeff Capone: "Keep Mobile Data and Applications in Sync with Java". Java Article, May 1, 2002, pp. 1-6 http://java.sys-con.com/node/36992.

* cited by examiner

*Primary Examiner* — Shirley Zhang
(74) *Attorney, Agent, or Firm* — Merchant & Gould

(57) ABSTRACT

Embodiments are provided for the granular data synchronization of multiple data objects. A three-tiered cache may be automatically generated by an application program. A server data object may be stored in a first tier and may include a first set of properties for a current state of data stored on a server. A client data object may be stored in a second tier and may include a second set of properties including one or more properties in the first set and/or un-persisted edits made to the first set. A view data object may be stored in a third tier and may include a third set of properties including un-persisted and unsaved edits made to the first or second set which are being viewed on a client. The server and client data objects may be synchronized to determine edits made to the data stored on the server.

20 Claims, 4 Drawing Sheets

GRANULAR DATA SYNCHRONIZATION FOR EDITING MULTIPLE DATA OBJECTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Client-side editing tools may be utilized to manage changes made to shared data in client-server computer networks. Current client-side editing tools utilize a cache in which object data is maintained. The object data may include server data, user changes made to the server data on the client, and view data (e.g., data being viewed on the client but which has not yet been saved). Under the cache method utilized by current client-side editing tools, the server data, user changes, and view data are mixed together in a single object. As a result, it is difficult under the single cache method to separate changes made to data by the user or to integrate new changes that have been made on the server into what is cached on the client. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for the granular data synchronization of multiple data objects. A three-tiered cache may be automatically generated by an application program. A server data object may be stored in a first tier and may include a first set of properties for a current state of data stored on a server. A client data object may be stored in a second tier and may include a second set of properties including one or more properties in the first set and/or un-persisted edits made to the first set. A view data object may be stored in a third tier and may include a third set of properties including un-persisted and unsaved edits made to the first or second set which are being viewed on a client. The server and client data objects may be synchronized to determine edits made to the data stored on the server.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for the granular data synchronization of multiple data objects. A three-tiered cache may be automatically generated by an application program. A server data object may be stored in a first tier and may include a first set of properties for a current state of data stored on a server. A client data object may be stored in a second tier and may include a second set of properties including one or more properties in the first set and/or un-persisted edits made to the first set. A view data object may be stored in a third tier and may include a third set of properties including un-persisted and unsaved edits made to the first or second set which are being viewed on a client. The server and client data objects may be synchronized to determine edits made to the data stored on the server. The client cache may utilize an identifier for identifying a property type associated with the first set of properties. The first set of properties may include one or more data values stored on the server.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
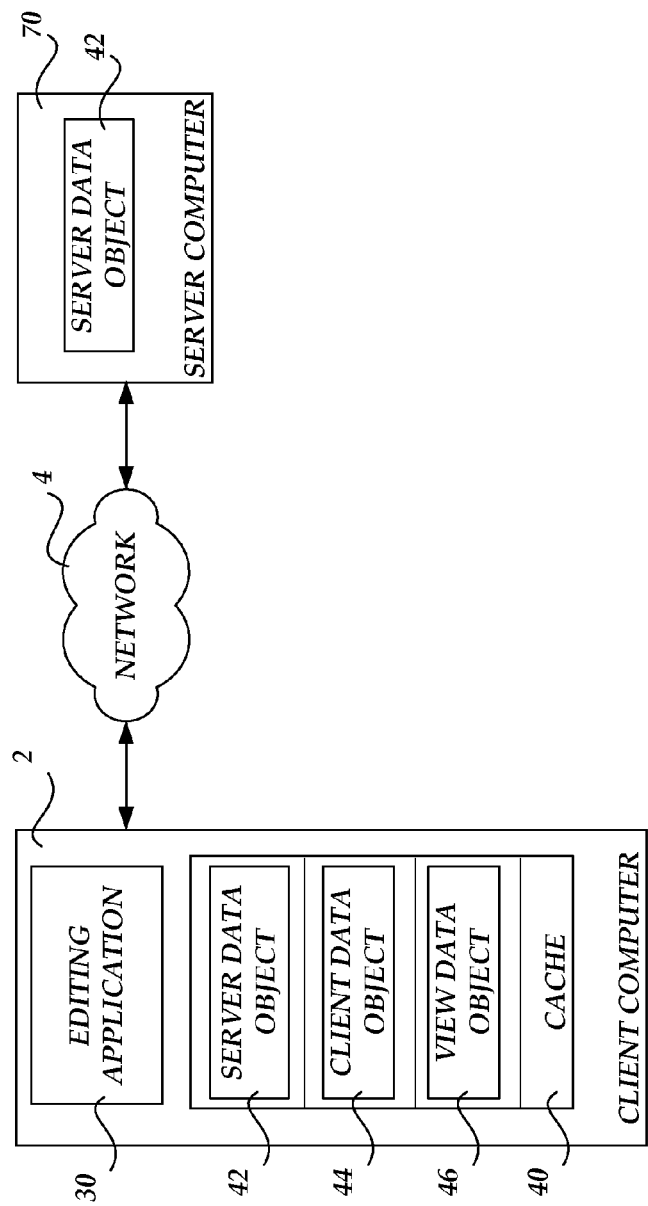
FIG. 1 is a block diagram illustrating a client-server network architecture which may utilize granular data synchronization for editing multiple data objects, in accordance with various embodiments.

Referring now to the drawings, in which like numerals represent like elements through the several figures, various aspects of the present invention will be described. FIG. 1 is a block diagram illustrating a client-server network architecture which may utilize granular data synchronization for editing multiple data objects, in accordance with various embodiments. The network architecture includes a client computer 2 in communication with a server computer 70 over a network 4. The client computer 2 may include an editing application 30 and a cache 40. The cache 40 may include a server data object 42, a client data object 44, and a view data object 46. The server computer 70 may also include the server data object 42. In accordance with various embodiments, the network 4 may comprise a local area network or a wide area network, such as the Internet.

In accordance with various embodiments, a data object may comprise a collection of data and a property may comprise discrete pieces of data in an object including, but not limited to, data values such as text and numbers. The server data object 42 may include the current state of a set of properties (i.e., one or more properties) stored on the server computer 70. The client data object 44 may include either the current state of the set of properties stored on the server computer 70 or un-persisted edits (i.e., changes) made to the set of properties which have been saved to the client computer 2. The view data object may include the current state of the properties stored on the server computer 70 or un-persisted and unsaved edits made to the properties while the properties are being viewed (e.g., in a user interface) on the client computer 2.

It should be understood that the data objects 42, 44, and 46 may comprise different versions or "models" of the same data object. Thus, the data objects 42, 44, and 46 may be multiple-interdependent objects. In particular, the server data object 42 may represent a server version or model of a data object, the client data object 44 may represent a client version or model of the data object, and the view data object 46 may represent a view version or model of the data object. It should be further understood that the cache 40 may comprise three individual and separate layers or tiers (i.e., a three-tiered cache) for storing independent copies of the data objects 42, 44, and 46 in the client computer 2.

In accordance with various embodiments and as will be described in greater detail below with respect to FIGS. 2-5, the editing application 30 may be configured to automatically generate the cache 40 through a declarative scheme and store the server data object 42, the client data object 44, and the view data object 46 in the cache 40. The editing application 30 may also be configured to synchronize the server data object 42, the client data object 44, and the view data object 46 to determine user edits (i.e., changes) which have been made to the client data object 44 and view data object 46 as well as perform a granular refresh of server changes by integrating changes made to the server object 42 on the server computer 70 into the data objects 42, 44, and 46 which are cached on the client computer 2. The editing application 30 may further be configured to generate change notifications between related data objects (i.e., when changes have been made to one or more of the data objects 42, 44, and 46).

It should be understood that the various components of the network architecture comprising the client computer 2, the server computer 70 and the network 4 may be configured using a distributed operating system for web-based applications such as the operating system in SHAREPOINT services technology developed by MICROSOFT CORPORATION of Redmond, Wash. For example, the editing application 30 may comprise the SHAREPOINT Designer application customization tool. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized. It should be further understood that the embodiments described herein should not be construed as being limited to the aforementioned software applications and that other software applications from other developers and/or manufacturers may also be utilized. It should further be understood that the network architecture of FIG. 1 and its components include functionality to communicate with other computing devices, communication devices, and/or other systems and are not intended to be limited to the embodiments and examples described herein.

Exemplary Operating Environment

Figure 2:
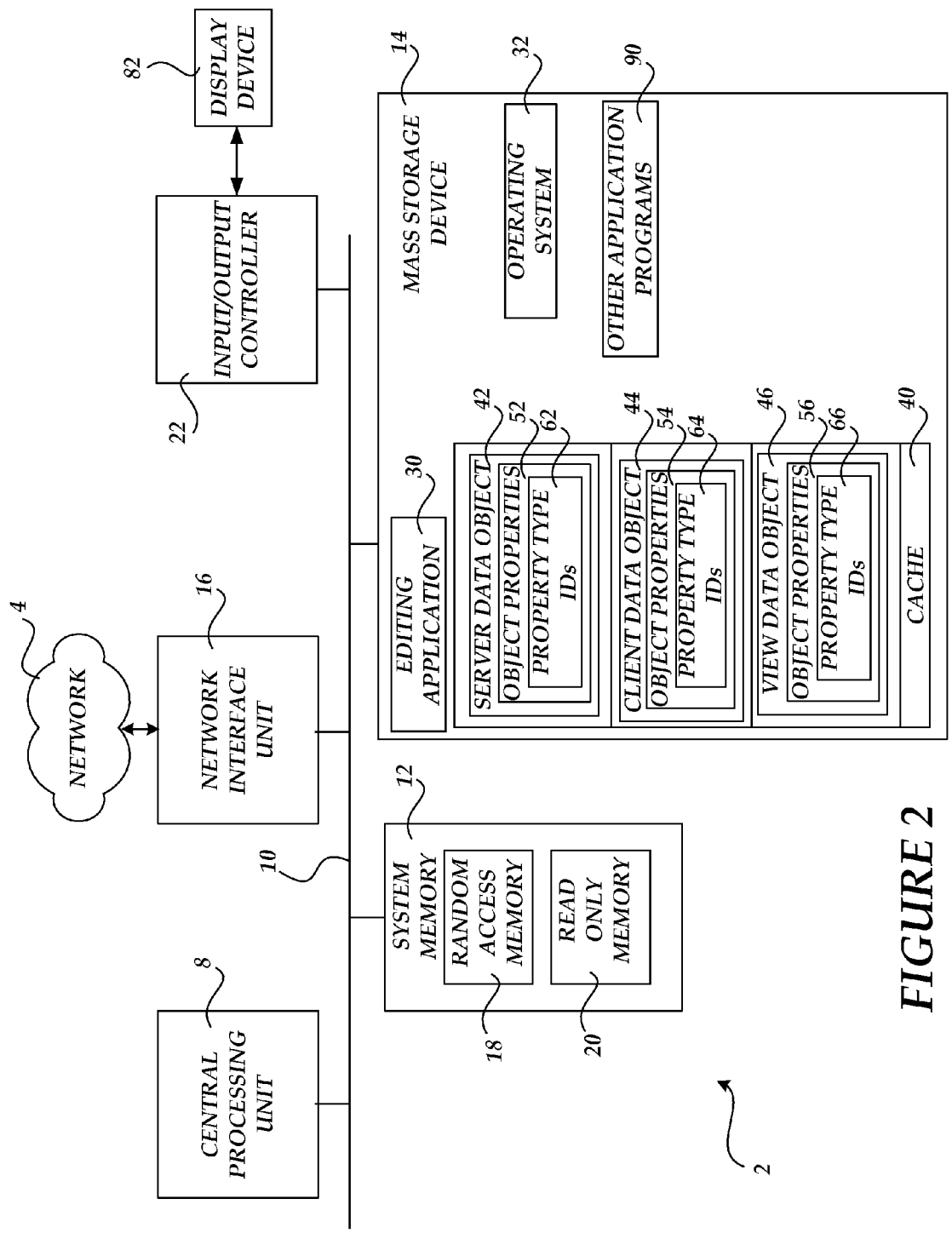
FIG. 2 is a block diagram illustrating a client computing environment which may utilize granular data synchronization for editing multiple data objects, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a personal computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with other computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the client computer 2 which may include a general purpose desktop, laptop, handheld, tablet, or other type of computer capable of executing one or more application programs. The client computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The client computer 2 further includes a mass storage device 14 for storing an operating system 32, the editing application 30, the cache 40, and other application programs 90. As discussed above, the editing application 30 may be configured to automatically generate the cache 40 through a declarative scheme and store the server data object 42, the client data object 44, and the view data object 46 in the cache 40, synchronize the server data object 42, the client data object 44, and the view data object 46 to determine user edits (i.e., changes) which have been made to the client data object 44 and view data object 46 as well as perform a granular refresh of server changes by integrating changes made to the server object 42 on the server computer 70 into the data objects 42, 44, and 46 which are cached on the client computer 2, and generate change notifications between related data objects (i.e., when changes have been made to one or more of the data objects 42, 44, and 46). The other applications programs 90 may include a web browser application for locating and displaying Web pages on the client computer 2.

The cache 40 includes three tiers of data objects including the server data object 42, the client data object 44, and the view data object 46. The server data object 42 includes object properties 52. The object properties 52 may comprise discrete pieces of data in the server data object 42 such as text, numbers, or other data. The object properties 52 include property type identifiers 62. The property type identifiers 62 identify property types associated with the object properties 52. The client data object 44 includes object properties 54. The object properties 54 may comprise discrete pieces of data in the client data object 44 such as text, numbers, or other data. The object properties 54 include property type identifiers 64. The view data object 46 includes object properties 56. The object properties 56 may comprise discrete pieces of data in the view data object 46 such as text, numbers, or other data. The object properties 56 include property type identifiers 66.

Illustrative property types identified by the property type identifiers 62, 64, and 66 may include, but are not limited to, strings (e.g., text), values (e.g., numbers), and other types of data. In accordance with an embodiment and as will be described in greater detail below in the discussion of FIGS. 3-5, the editing application 30 may be configured (e.g., by a developer) to assign the property type identifiers 62 64, 66 to the properties 52, 54, and 56 thus facilitating the generation of notifications with respect to changes in the properties for the data objects 42, 44, and 46 by specifying only the identifiers instead of a plurality of values associated with each identifier through the use of a pointer to a data object (or model). In accordance with another embodiment, the editing application 30 may be include one or more macros or helper functions which utilize the property identifiers 62, 64, and 66 to iterate through the properties 52, 54, and 56 thereby facilitating the synchronization of the data objects 42, 44, and 46.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed or utilized by the client computer 2. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CAROM, digital versatile disks ("DVD"), or other optical storage, magnetic cassettes, magnetic tape, magnetic disk storage or other magnetic storage devices, which can be used to store the desired information and which can be accessed by the client computer 2. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as a computer program product.

According to various embodiments, the client computer 2 may operate in a networked environment using logical connections to remote computers through the network 4 which may comprise, for example, a local network or a wide area network (e.g., the Internet). The client computer 2 may connect to the network 4 through a network interface unit 16 connected to the bus 10. It should be appreciated by those skilled in the art that when operating in a networked environment, the client computer 2 may be in communication with one or more remote servers hosting a shared services platform such as the SHAREPOINT SERVER platform from Microsoft Corporation of Redmond, Wash. It should be appreciated that the network interface unit 16 may also be utilized to connect to other types of networks and remote computing systems. The client computer 2 may also include an input/output controller 22 for receiving and processing input from a number of input types, including a keyboard, mouse, pen, stylus, finger, and/or other means. Similarly, an input/output controller 22 may provide output to a display device 82, a printer, or other type of output device. Additionally, a touch screen can serve as an input and an output mechanism.

Figure 3:
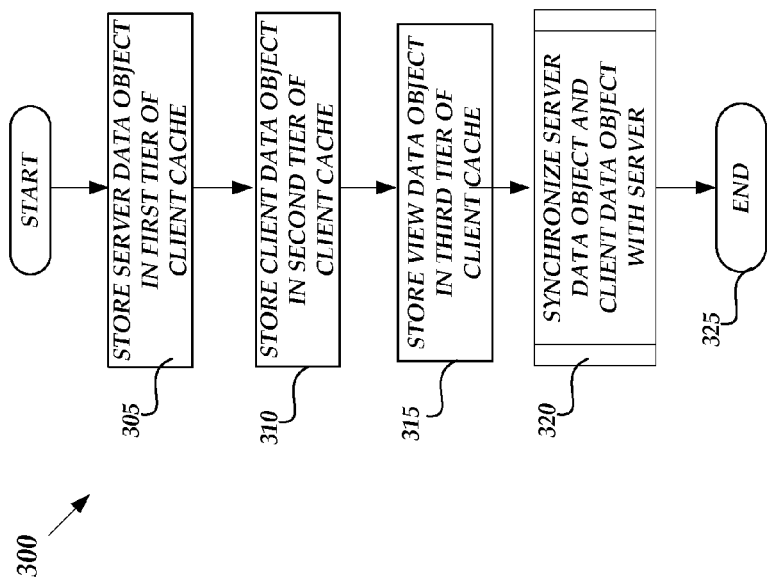
FIG. 3 is a flow diagram illustrating a routine for granular data synchronization to edit multiple data objects, in accordance with an embodiment.

FIG. 3 is a flow diagram illustrating a routine 300 for granular data synchronization to edit multiple data objects, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-5 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the editing application 30 executing on the client computer 2 stores the server data object 42 in the first tier of the cache 40. As discussed above, the server data object 42 represents a current state of the properties 52 stored in the server data object 42 on the server computer 70. For example, the properties 52 in the server data object 42 may comprise website data for a collaborative website hosted on the server computer 70 in which multiple users may change the data stored therein. Thus, the server data object 42 may contain the current state of any data which has been modified and saved to the server 70 by an external client.

From operation 305, the routine 300 continues to operation 310 where the editing application 30 executing on the client computer 2 stores the client data object 44 in the second tier of the cache 40. As discussed above, the client data object 44 may include either the current state of properties stored on the server computer 70 or un-persisted edits (i.e., changes) made to the properties which have been saved to the client computer 2. For example, the properties 54 in the client data object 44 may comprise changes which have not yet been posted to a collaborative website hosted on the server computer 70.

From operation 310, the routine 300 continues to operation 315 where the editing application 30 executing on the client computer 2 stores the view data object 46 in the third tier of the cache 40. As discussed above, the view data object 46 may include the current state of the properties stored on the server computer 70 or un-persisted and unsaved edits made to the properties while the properties are being viewed (e.g., in a user interface) on the client computer 2. For example, the properties 56 in the view data object 46 may comprise changes made in a user interface for editing a collaborative website which have not yet been saved to the client computer 2 or to the server computer 70.

From operation 315, the routine 300 continues to operation 320, where the editing application 30 synchronizes the server data object 42 and the client data object 44 (both on the client computer 2) to determine and persist any edits made to the server data object 42 (i.e., the server data object properties) on the server computer 70. An illustrative routine for synchronizing the server and client data objects 42 and 44 with the server computer 70 will be described in greater detail below in the discussion of FIG. 4. From operation 320, the routine 300 continues to operation 325, where the routine 300 then ends.

Figure 4:
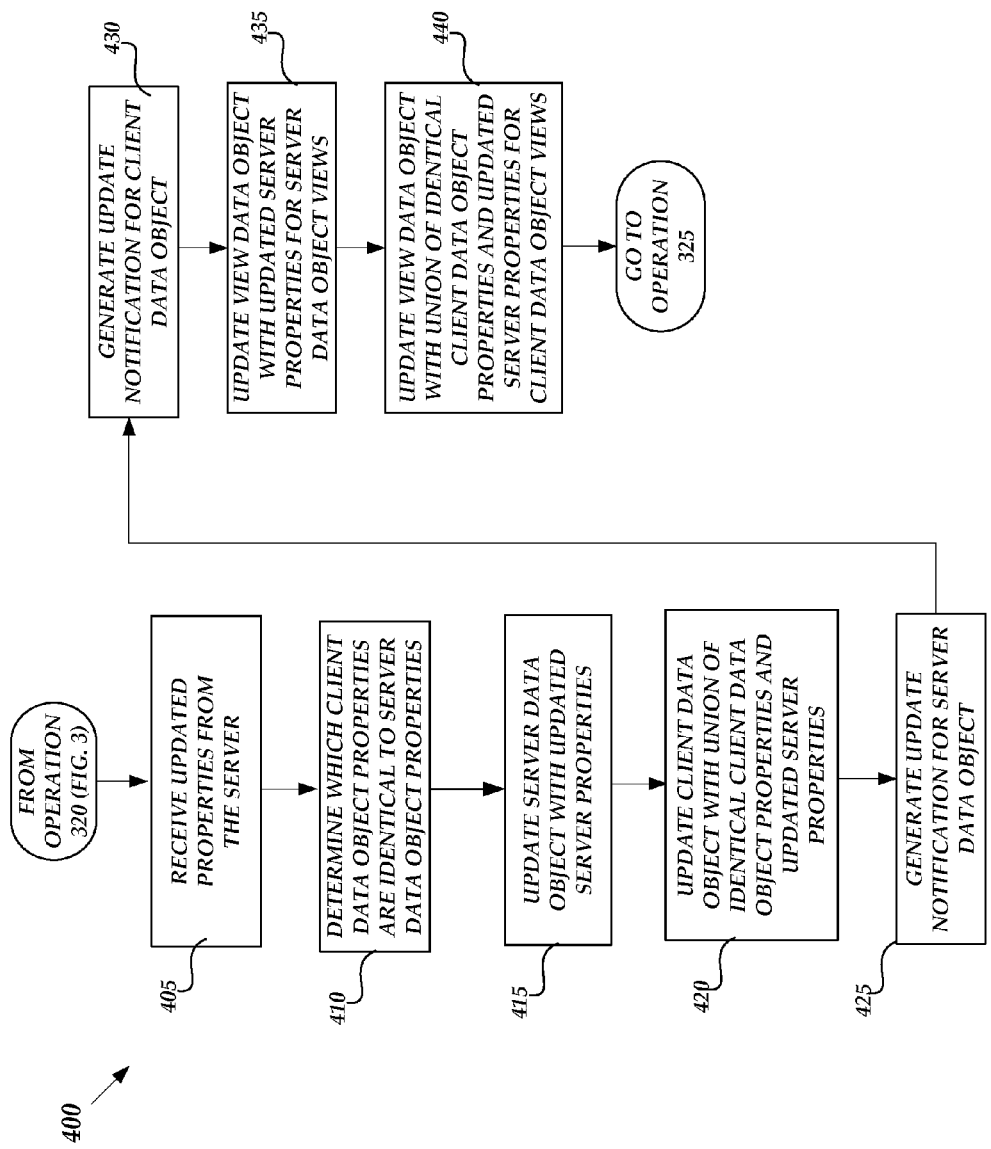
FIG. 4 is a flow diagram illustrating a routine for synchronizing a server data object and a client data object with a server to edit server, client, and view data objects, in accordance with an embodiment.

FIG. 4 is a flow diagram illustrating a routine 400 for synchronizing a server data object and a client data object with a server to edit server, client, and view data objects, in accordance with an embodiment. The routine 400 begins from operation 320 of FIG. 3 and continues to operation 405, where the editing application 30 receives updated properties for the server data object 42 from the server computer 70.

From operation 405, the routine 400 continues to operation 410 where the editing application 30 determines which of the client data object properties 52 are identical to the server data object properties 52. In particular, the editing application 30 may determine whether one or more of the properties 54 are identical to one or more of the properties 52. In accordance with an embodiment, the editing application 30 may store an additional piece of data for each property that tracks whether, for a given property, the client data object 44 and the server data object 42, differ. In accordance with an embodiment, the property tracking data may include a data structure comprising a bit field, where each bit corresponds to a particular property. In accordance with another embodiment, the editing application 30 may not actively track property changes but rather may be configured to calculate, prior to any updates, which properties on the client computer 2 may be safely updated from the server computer 70. In accordance with an embodiment and as discussed above in the description of FIG. 2, the editing application 30 may utilize the property type identifiers 62 and 64 to facilitate identifying the properties for the comparison.

From operation 410, the routine 400 continues to operation 415 where the editing application 30 updates the server data object 42 (in the cache 40) with the updated properties from the server 70. As a result, the server data object 42 (in the cache 40) will include the latest changes made to the server data object 42 on the server computer 70. In accordance with an embodiment, the identical properties in the client data object 44 may be added to a safe client data object property update structure (not shown) on the client computer 2. In accordance with an embodiment, the property update structure may comprise a bit field, where each bit corresponds to a particular property.

From operation 415, the routine 400 continues to operation 420 where the editing application 30 updates the client data object 44 with a union of: (1) the client data object properties 54 which were determined (at operation 410) to be identical to the server data object properties 52 (prior to the server data object 42 being updated); and (2) the updated properties retrieved from the server computer 70 (at operation 405). As a result of the union, only the client data object properties 54 which were identical to the server data object properties 52 prior to receiving the updated properties from the server computer 70, are updated. Any non-identical properties (i.e., client data object properties 54 which are not identical to corresponding server data object properties 52) will not be updated thereby preserving any un-persisted property changes made by a user in the client data object 44. If all of the client data object properties 54 are identical to corresponding server data object properties 52 (i.e., there are no un-persisted property changes), then all of the client data object properties 54 will be updated. On the other hand, if none of the client data object properties 54 are identical to corresponding server data object properties 52 (i.e., all of the client data object properties 54 have been changed and are un-persisted), then none of the client data object properties 54 will be updated.

From operation 420, the routine 400 continues to operation 425 where the editing application 30 generates an update notification for the server data object 42. In particular, the editing application 30 may be configured to broadcast an update notification for the server data object 42. The update notification may include the updated properties from the server computer 70 so that any views displaying information for the server data object 42 may identify one or more properties to update in the view data object 46.

From operation 425, the routine 400 continues to operation 430 where the editing application 30 generates an update notification for the client data object 44. In particular, the editing application 30 may be configured to broadcast an update notification for the client data object 42. The update notification may include the union of the client data properties 54 and the updated properties retrieved from the server computer 70 (discussed above at operation 420) so that any views displaying information for the client data object 42 may identify one or more properties to update in the view data object 46. In accordance with an embodiment, the update notifications discussed above at operations 425 and 430 may be generated and broadcast in any order. In accordance with another embodiment, the update notifications may be broadcast separately or combined into a single update notification.

From operation 430, the routine 400 continues to operation 435 where the editing application 30 updates the view data object 46 with the updated server properties received at operation 405, for views of the server data object 42 (i.e., when one or more of the server data object properties 52 are being viewed) on the client computer 2.

From operation 435, the routine 400 continues to operation 440 where the editing application 30 updates the view data object 46 with the union of the client data properties 54 (discussed above at operation 420) and the updated server properties received at operation 405, for views of the client data object 44 (i.e., when one or more of the client data object properties 54 are being viewed) on the client computer 2.

From operation 440, the routine 400 returns to operation 325 of FIG. 3. In one embodiment, when the editing application 30 determines that none of the client data object properties 54 are identical to corresponding server data object properties 52 (i.e., all of the client data object properties 54 have been changed and are un-persisted), then the operations 420, 430, and 440 may be skipped since they involve the updating of the client data object properties 54. As discussed above, the client data object properties 54 are updated only if at least one of the client data object properties 54 is identical to a corresponding server data object properties 52 prior to receiving the updated properties from the server computer 70.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of granular data synchronization for editing multiple data objects on a client computer operating in a client-server computer network, comprising:

storing in a first tier of a client cache, by the client computer, a server data object, the server data object comprising a first set of properties, the set of properties comprising a current state of at least one data value stored on a server computer in the computer network, wherein the client cache utilizes an identifier for identifying a property type associated with the first set of properties;

storing in a second tier of the client cache, a client data object, the client data object comprising a second set of properties, the second set of properties comprising at least one of: one or more properties in the first set of properties and un-persisted edits made to the first set of properties which are saved on the client computer;

storing in a third tier of the client cache, a view data object, the view data object comprising a third set of properties, the third set of properties comprising un-persisted and unsaved edits made to at least one of the first set of properties and the second set of properties while the at least one of the first set of properties and the second set of properties is being viewed in a user interface on the client computer, the client cache being automatically generated, through a declarative scheme, by an editing application program running on the client computer, the first tier, the second tier and the third tier comprising three individual and separate layers in the client cache which store independent copies of the server data object, the client data object and the view data object; and synchronizing the server data object and the client data object with the server computer to determine edits made to the at least one data value stored on the server computer, the synchronization comprising determining whether one or more properties in the second set of properties are identical to one or more properties in the first set of properties, the editing application program storing property tracking data, for each property in the first set of properties and the second set of properties, that tracks whether, for a given property, the client data object and the server data object differ, the property tracking data comprising a data structure comprising a bit field, each bit in the bit field corresponding to a particular property.

2. The method of claim 1, wherein synchronizing the server data object and the client data object with the server computer to determine edits made to the at least one data value stored on the server computer comprises:

receiving an updated set of properties from the server computer; and comparing the first set of properties with the second set of properties.

3. The method of claim 2 further comprising:

updating the server data object with the updated set of properties received from the server computer; and updating the client data object with a union of identical properties in the first and second sets of properties and the updated set of properties received from the server computer.

4. The method of claim 3 further comprising generating an update notification for the server data object, the update notification including the updated set of properties received from the server computer.

5. The method of claim 3 further comprising generating an update notification for the client data object, the update notification including the union of the identical properties in the first and second sets of properties and the updated properties received from the server computer.

6. The method of claim 4 further comprising updating the third set of properties in the view data object with the updated set of properties received from the server computer for views of the server data object on the client computer.

7. The method of claim 5 further comprising updating the third set of properties in the view data object with the union of the identical properties in the first and second sets of properties and the updated properties received from the server computer for views of the client data object on the client computer.

8. A system for granular data synchronization for editing multiple data objects in a client-server computer network, comprising:

a client computer comprising a memory for storing executable program code and a processor, wherein the processor is functionally coupled to the memory and responsive to computer-executable instructions contained in the program code, wherein the processor is operative to:

store in a first tier of a client cache, a server data object, the server data object comprising a first set of properties, the set of properties comprising a current state of at least one data value stored on a server computer in the computer network, wherein the client cache utilizes an identifier for identifying a property type associated with the first set of properties;

store in a second tier of the client cache, a client data object, the client data object comprising a second set of properties, the second set of properties comprising at least one of: one or more properties in the first set of properties and un-persisted edits made to the first set of properties which are saved on the client computer;

store in a third tier of the client cache, a view data object, the view data object comprising a third set of properties, the third set of properties comprising un-persisted and unsaved edits made to at least one of the first set of properties and the second set of properties while the at least one of the first set of properties and the second set of properties is being viewed in a user interface on the client computer, the client cache being automatically generated, through a declarative scheme, by an editing application program running on the client computer, the first tier, the second tier and the third tier comprising three individual and separate layers in the client cache which store independent copies of the server data object, the client data object and the view data object; and synchronize the server data object and the client data object with the server computer to determine edits made to the at least one data value stored on the server computer, the synchronization comprising determining whether one or more properties in the second set of properties are identical to one or more properties in the first set of properties, the editing application program storing property tracking data, for each property in the first set of properties and the second set of properties, that tracks whether, for a given property, the client data object and the server data object differ, the property tracking data comprising a data structure comprising a bit field, each bit in the bit field corresponding to a particular property.

9. The system of claim 8, wherein the processor, in synchronizing the server data object and the client data object with the server to determine edits made to the at least one data value stored on the server computer, is further operative to:

receive an updated set of properties from the server computer; and compare the first set of properties with the second set of properties.

10. The system of claim 9, wherein the processor is further operative to:

update the server data object with the updated set of properties received from the server computer; and update the client data object with a union of identical properties in the first and second sets of properties and the updated set of properties received from the server computer.

11. The system of claim 10, wherein the processor is further operative to generate an update notification for the server data object, the update notification including the updated set of properties received from the server computer.

12. The system of claim 10, wherein the processor is further operative to generate an update notification for the client data object, the update notification including the union of the identical properties in the first and second sets of properties and the updated properties received from the server computer.

13. The system of claim 11, wherein the processor is further operative to update the third set of properties in the view data object with the updated set of properties received from the server computer for views of the server data object on the client computer.

14. The system of claim 12, wherein the processor is further operative to update the third set of properties in the view data object with the union of the identical properties in the first and second sets of properties and the updated properties received from the server computer for views of the client data object on the client computer.

15. A computer-readable hardware storage device comprising computer executable instructions which, when executed on a client computer, will cause the client computer to perform a method of granular data synchronization for editing multiple data objects in a client-server computer network, comprising:

storing, by a computer processor in a memory device, in a first tier of a client cache, a server data object, the server data object comprising a first set of properties, the set of properties comprising a current state of at least one data value stored on a server computer in the computer network, wherein the client cache utilizes an identifier for identifying a property type associated with the first set of properties;

storing in a second tier of the client cache, a client data object, the client data object comprising a second set of properties, the second set of properties comprising at least one of:

one or more properties in the first set of properties and un-persisted edits made to the first set of properties which are saved on the client computer;

storing in a third tier of the client cache, a view data object, the view data object comprising a third set of properties, the third set of properties comprising un-persisted and unsaved edits made to at least one of the first set of properties and the second set of properties while the at least one of the first set of properties and the second set of properties is being viewed in a user interface on the client computer, the client cache being automatically generated, through a declarative scheme, by an editing application program running on the client computer, the first tier, the second tier and the third tier comprising three individual and separate layers in the client cache which store independent copies of the server data object, the client data object and the view data object, the first set of properties, the second set of properties and the third set of properties each comprising at least one of a strings property type associated with text and a values property type associated with numbers, the first, second and third set of properties each comprising at least one of text data and number data; and synchronizing the server data object and the client data object with the server computer to determine edits made to the at least one data value stored on the server computer, the synchronization comprising determining whether one or more properties in the second set of properties are identical to one or more properties in the first set of properties, the editing application program storing property tracking data, for each property in the first set of properties and the second set of properties, that tracks whether, for a given property, the client data object and the server data object differ, the property tracking data comprising a data structure comprising a bit field, each bit in the bit field corresponding to a particular property.

16. The computer-readable hardware storage device of claim 15, wherein synchronizing the server data object and the client data object with the server computer to determine edits made to the at least one data value stored on the server computer comprises:

receiving an updated set of properties from the server computer;

comparing the first set of properties with the second set of properties;

if one or more properties in the first set of properties is identical to one or more properties in the second set of properties, then adding the identical properties to a property update structure in the client data object;

updating the server data object with the updated set of properties received from the server computer; and updating the client data object with a union of identical properties in the first and second sets of properties and the updated set of properties received from the server computer.

17. The computer-readable hardware storage device of claim 16 further comprising generating an update notification for the server data object, the update notification including the updated set of properties received from the server computer.

18. The computer-readable hardware storage device of claim 16 further comprising generating an update notification for the client data object, the update notification including the union of the identical properties in the first and second sets of properties and the updated properties received from the server computer.

19. The computer-readable hardware storage device of claim 17 further comprising updating the third set of properties in the view data object with the updated set of properties received from the server computer for views of the server data object on the client computer.

20. The computer-readable hardware storage device of claim 18 further comprising updating the third set of properties in the view data object with the union of the identical properties in the first and second sets of properties and the updated properties received from the server computer for views of the client data object on the client computer.

* * * * *